J. R. Pilkay.
Thermometer Churn.
No. 87,064.        Patented Feb. 16, 1869.
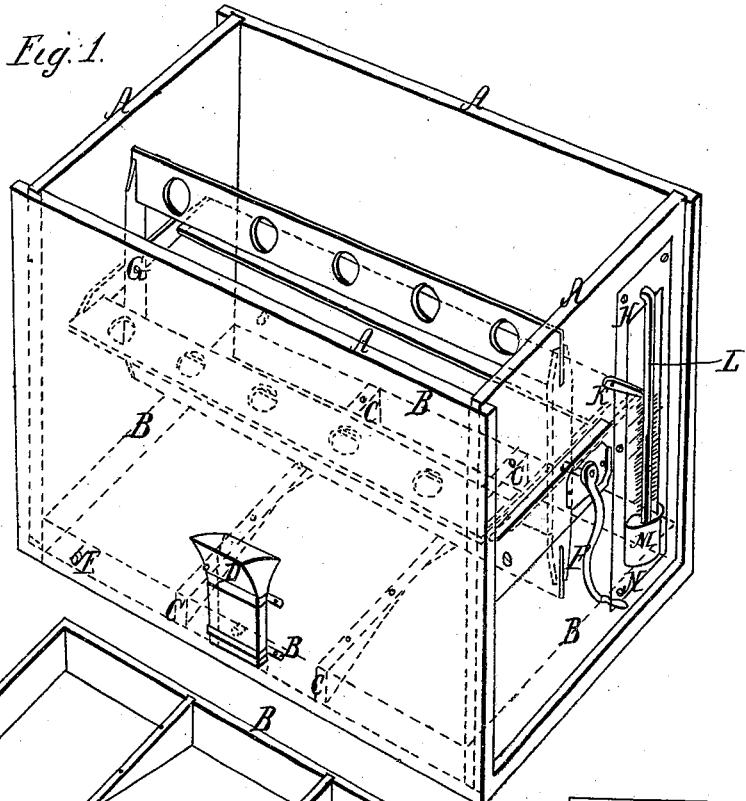
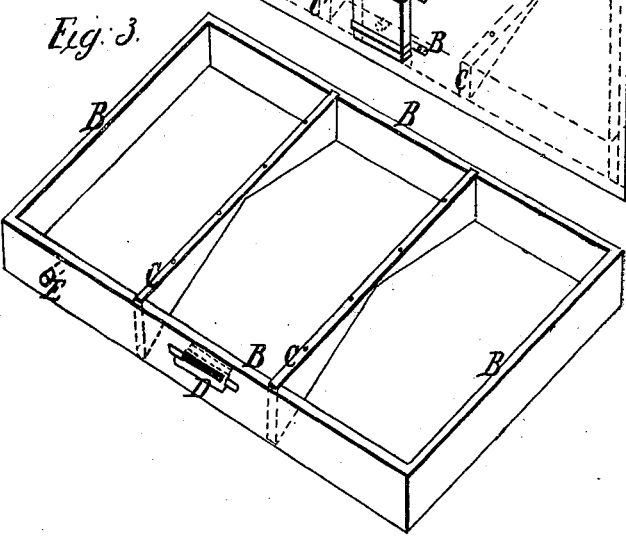
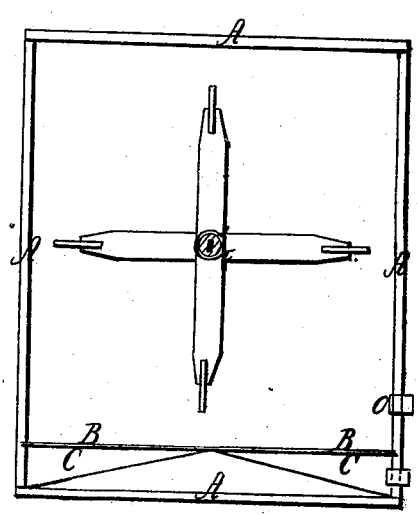
Witnesses:
Frank E. Beethoven
W. Clepper
Inventor:
John R. Pilkay

United States Patent Office.

JOHN R. PILKAY, OF CARLISLE, PENNSYLVANIA.

Letters Patent No. 87,064, dated February 16, 1869.

IMPROVEMENT IN THERMOMETER-CHURNS.

The Schedule referred to in these Letters Patent and making part of the same.

*To all whom it may concern:*

Be it known that I, JOHN R. PILKAY, of Carlisle, Cumberland county, Pennsylvania, have invented a new and useful Improved Thermometer-Churn; and I do hereby declare that the following is a full, clear, and exact description of the construction and operation of the same, reference being had to the annexed drawings, forming a part of this specification, in which—

Figure 1 is a perspective view.
Figure 2 is a bisectional view.
Figure 3 is an interior view of the water-chamber.

To enable others skilled in the art to make and use my invention, I will describe its construction and operation.

I construct the churn in a rectangular form, A A A A, with the aperture P in the top or lid thereof, for the admission of air.

I fasten, with screws, the zinc sheet or bottom, B B B B, on the cross-pieces C C, &c., which are an inch, or more or less, in width and thickness, and are straight on the upper side, and angular or arcuate on the lower side, and while the ends thereof rest on the bottom of A A A A, there is a free passage for water to all parts of the chamber, between the zinc and wooden bottoms.

On the outer side of A A A A, I construct the funnel D D, communicating, by the aperture at D, with the aforesaid chamber, between the zinc and wooden bottoms.

At E is an aperture for the discharge of the water.

At O, on the other outer side of A A A A, and above the chamber, is an aperture for the discharge of the milk after the butter has been churned therefrom.

The dasher, constructed in any of the usual forms, and caused to revolve by the ordinary crank, is suspended between the screw-axle G and the rectangular socket and axle F, and can be inserted and removed at pleasure.

On the outer end of A A A A, beside the crank F, I fasten, with screws, the zinc plate H, communicating at the lower end with the interior of the churn, by an aperture in A A A A.

On the zinc plate H, I fasten, by the ratchet K and the cross-piece N, the thermometer L, regulated to gauge a few degrees above and below 62°, the temperature at which butter is most easily churned from cream.

On the lower end of the thermometer I construct a water-chamber, M, which is to be kept filled with water.

The manner of the operation of the churn is as follows:

The cream is poured into the churn, and the temperature thereof is at once communicated to the water surrounding the globe of the thermometer, which indicates whether it is above or below 62°. If the temperature of the cream is above 62°, as it generally is in the summer-season, cold water must be poured through the funnel D D into the chamber, under the zinc bottom, until the temperature of the cream is reduced to 62°, or thereabout. If the temperature of the cream is below 62°, hot water must be substituted for cold, and permitted to remain in the chamber until the temperature of the cream is raised to 62°, or thereabout.

I am aware that a number of churns, with hot and cold-water chambers and thermometers, called thermometer-churns, have been patented. I have seen and tested most of them, and disclaim any part thereof. In all of them the chambers have been made of zinc, and extended entirely around the churn.

I claim an improvement, new and useful, on these—

First, in that those churns which are constructed entirely of zinc, from the expansion and contraction of that metal from heat and cold, become leaky and shapeless in a short time. By confining the chamber to the bottom only, and fastening the zinc firmly, by screws, to the cross-pieces C C, &c., this difficulty is entirely obviated.

Second, I claim an improvement, in that, when the zinc extends along the sides of the churn, the butter sticks thereto, rendering the gathering of it extremely tedious and troublesome. By constructing the sides of wood, the butter floating on the milk does not touch the zinc at the bottom.

Again, all the thermometer-churns patented thus far have had the ordinary thermometer fastened permanently to the churn. I have found that, from a variety of causes, the thermometers are liable to be broken. I claim an improvement in having the thermometer separate, and easily adjusted or removed, when desired.

Again, I claim an improvement in the water-chamber M, which, being kept full of tepid water, forms a uniform and perfect medium of temperature between the cream and the globe of the thermometer.

I claim an improvement in the construction of axle and socket F in a rectangular shape, in that the square form in use is more liable to wear and become loose.

What I claim specifically as new and useful improvements, and desire to secure by Letters Patent, is—

The rectangular churn A A A A, the zinc bottom B B B B, fastened upon the pieces C C, &c., the funnel D D, the aperture E, the aperture O, the permanent zinc plate H, the piece N, the ratchet K, the thermometer L, with the chamber M, and the screw-axle G, and the rectangular socket and axle F, all constructed and combined in the manner and for the purpose herein set forth.

JOHN R. PILKAY.

Witnesses:
FRANK E. BELTZHOOVER,
WM. CLEPPER.